United States Patent
Crook

Patent Number: 6,166,525
Date of Patent: Dec. 26, 2000

[54] AUTOMATIC ELECTRIC POWER GENERATOR CONTROL

[76] Inventor: Gaines M. Crook, 7568 Chaminade Ave., Canoga Park, Calif. 91034

[21] Appl. No.: 09/013,120

[22] Filed: Jan. 26, 1998

[51] Int. Cl.[7] .............................. H02P 3/00; H02H 7/06; B60L 11/02
[52] U.S. Cl. ............................ 322/11; 322/36; 290/30 B
[58] Field of Search ..................................... 322/36, 1, 11; 290/30 B, 31, 32, 34, 35; 307/10.3, 10.6; 123/179.3, 179.4

[56] References Cited

U.S. PATENT DOCUMENTS

| | | | |
|---|---|---|---|
| 2,898,542 | 8/1959 | Wasko et al. | 322/1 |
| 3,866,059 | 2/1975 | Przywozny | 307/10.6 |
| 4,454,560 | 6/1984 | Nakao et al. | 361/257 |
| 5,168,418 | 12/1992 | Hurley et al. | 361/155 |
| 5,377,641 | 1/1995 | Salazar | 123/179.4 |
| 5,561,330 | 10/1996 | Crook | 290/30 R |

*Primary Examiner*—Nestor Ramirez
*Assistant Examiner*—Peter Medley
*Attorney, Agent, or Firm*—Don A. Hollingsworth

[57] ABSTRACT

A controller operates to start an electric power generator, for example a gasoline engine electric power generator, when a demand is made for electric power when the user turns on an electric powered device, such as a circular saw, that is to be used. The generator runs as long as there is a demand for power, and when the demand ends, the generator stops after a predetermined adjustable delay period. Additionally, in the event the engine is to be started under cold start-up conditions, the starter is operated to avoid cyclical starting/stalling of the generator engine. The engine driving the generator will stop after a predetermined delay after the power demand is removed. If the demand for power stops for a time longer than the timeout period, the generator is stopped, and it will automatically start again when power is demanded. Alarm circuits are provided in the event of malfunction, and automatic/manual functions enhance the flexibility of the system.

11 Claims, 9 Drawing Sheets

AUTOMATIC ELECTRIC POWER GENERATOR CONTROL

BACKGROUND OF THE INVENTION

1. Field of the Invention

This invention relates to a controller for operating, on demand, small electric power generators, and more particularly to an improved controller for a small gasoline engine driven electric power generator, such controller designed to operate the electric power generator efficiently, thereby conserving energy resources and extending the useful life of the generator.

2. Brief Description of the Prior Art

The present invention represents several improvements over the invention shown and described in my prior U.S. Pat. No. 5,561,330. Controlling the operation of a gasoline-engine-operated electrical power generator in a variety of ways is known from my prior patent and from other prior art references.

For the purposes of this description, the term "generator" is applied to the whole machine, and the term "alternator" is applied to the part of the machine which generates the alternating current (AC) power to be supplied externally. There are a number of patents which deal with automatic voltage regulators for a wide variety of generators for vehicles, aircraft, and others.

Among these are U.S. Pat. Nos. 2,992,382; 4,184,083; 4,661,760; 4,749,944; 4,931,717; and 4,933,623. Also known are systems for controlling electric arc welders by starting the prime mover for the welding generator when the stinger is grounded to the work piece. Among these are U.S. Pat. Nos. 2,170,861; 2,237,894; 2,412,745; 2,419,276; 2,427,127; 2,480,635; 2,499,635; and 3,748,561. One of these, U.S. Pat. No. 2,412,745, was issued to David Packard, co-founder of the Hewlett-Packard Co.

U.S. Pat. No. 2,201,863 is an odd type of controller for a three phase wound rotor motor which is controlled in response to the number of times the load is cycled on and off.

U.S. Pat. No. 1,481,919, issued in 1924, is a rather complex system which is used with a 32 Volt DC farm power system in which a motor generator set driven by a 32 V DC motor and a generator having a "standard" voltage. The motor generator set also acts as a starter motor for the 32V generator's engine.

U.S. Pat. No. 2,427,462 (issued Sep. 16, 1947 to H. F. Kaelin) discloses a system which is sensitive to a load on the generator. The Kaelin patent was applied for May 14, 1945, so that comparing it with the controller of the present invention is somewhat difficult because of the 50 year technology gap between the two, as well as because the two are designed with different system concepts in mind for starting a generator. The Kaelin system was designed to be used in conjunction with the "Startex" or similar system which is required to actually start a generator and allow it run as long as a circuit closure is maintained.

The schematic of '462 is redrawn in the accompanying FIG. 1 using modern terms, so that it can be explained easier. The apparatus of the Kaelin patent merely senses a load and closes a relay when there is a load present on the generator and activates the generator engine. When the load is removed, the generator stops. Without the supplemental "Startex" system, it has no capability of starting the generator's engine, let alone differently under different environmental conditions, and provides no delay in opening the contacts of the relay after the load is removed, and is devoid of a number of features which are desirable and essential in today's competitive industry. According to the text of the patent, it was intended to be used with the "Startex" or other controller which starts the generator engine when an external circuit is closed and stops it when the external circuit is opened. An explanation of the operation, according to the schematic of FIG. 1, follows.

One lead 3 of the coil of relay K1 is permanently connected to the hot terminal of the battery 5. When a load 4, 6, and/or 8 is placed upon the generator output load terminals 9, 9', the other lead 11 of the coil of K1 is connected through the closed contacts 5 and 6 of relay K2, to ground through the load, and thence back to the other terminal of the battery 5, energizing and closing the contacts 7 of relay K1. This starts the engine by means of the other controller with which it is associated (not shown). When the engine starts and the generator 13 produces output power, the coil of relay K2 is energized by the generator output power, connecting contacts 1 to 2 and 4 to 5. Current being supplied to the output load terminals 9, 9' flows through the primary of the current transformer 15 and produces an output which is connected to the coil of relay K1, holding it closed as long as there is a load on the generator power output load terminals 9, 9'. When all loads are removed, current through the primary of current transformer 15 ceases, and the secondary of current transformer can no longer supply power to the coil of K1 which then opens contacts 7 to de-energize the generator 13.

The controller according to my U.S. Pat. No. 5,561,330 operates to start the generator when a demand is made for electric power when the user turns on the electric powered device that is to be used. The generator runs as long as there is a demand for power, and when the demand ends, the generator stops after a predetermined adjustable delay period. Additionally, in the event the engine is to be started under cold start-up conditions, the starter is operated to avoid cyclical starting/stalling of the generator engine.

The unit operates as follows. When a demand is made on the generator for power, for example if a carpenter is using the generator to operate a portable electric handsaw at a building site and gets ready to saw, he turns on the switch of the saw. The controller senses the circuit closure, operates the choke of the generator, turns on the starter of the generator, and, after the generator cranks, the power is applied to the saw and it starts to operate. The starter is controllably disabled after the generator is operational. Under most circumstances, after warmup, starting is only a matter of two or three seconds. The engine driving the generator will stop after a predetermined delay after the power demand is removed. If the carpenter has many cuts to make and only needs to reposition his saw to make the next cut, then the delay period will likely not be long, the demand on the generator returns before the delay times out, and thus the generator operates continuously. That is, if he starts the saw again before the timeout delay time expires, then the timing sequence (to shut the generator off temporarily) is aborted. If, however, he must get more lumber and position it for a cut, perhaps he would just let the generator time out and stop, and it will automatically start again when he is ready to saw again.

In developing my prior invention, two compete controllers were built and tested. A "breadboard" unit was built and connected to a Dayton brand 4 KW generator and a prototype was built to be connected to a Honda EM5000SX 5 KW generator. The one on the Honda is much more sophisticated and is a plug-in version that can be added without changing the generator in any way. The controller interfaces with the power output receptacle and the remote control connector and will operate in all modes provided by the generator, such as 120 V output only, 120 V–240 V output, and with the "Auto Throttle" feature on or off. The Auto Throttle feature is a feature on some Honda generators which will slow the engine down to a fast idle when the load is removed.

The object of both the Kaelin system and that of the present invention (and my prior invention) is to start the generator engine and provide power when a load is connected to the generator. Both sense that a load is present by monitoring for ohmic closure of the load circuit, either directly or indirectly with a relay or relays. Even though both systems sense the demand for power by sensing an ohmic continuity across the power load path, they do it in a different manner. The Kaelin system uses two relays in operation. The sense relay is used in actual sensing the presence of a load, and it remains closed during the whole time the generator is delivering power. The power relay is separate from the sense relay and is closed only during powered operation. In the system according to my prior invention, the sense path utilizes the back contacts of the power relay when it is not energized, but only those contacts which are not used during the power phase are connected to the controller. This is an isolation safety feature which is essential to meet certain governmental restriction requirements. The two systems do two fundamentally different things to accomplish the same goal of starting the generator. The whole purpose of the Kaelin system is to close one pair of contacts while a load is present, whether power is being delivered or not. The systems of my prior and present inventions include the complete functions of sensing, starting the generator, monitoring for power unloading, delaying, aborting delays upon return of demand, and stopping the generator, and also that of providing a means of transitioning from one operational state to another.

Due the similarity of the various major functional blocks and circuitry as between my prior invention and my present invention, this description will explain the operation of my prior invention as a basis for understanding the basic operation and features of an automatic electric power generator control system. The improvements and additional features will then be described in detail.

Description of the Automatic Electric Power Generator Control System according to U.S. Pat. No. 5,561,330

Referencing FIG. 2, the simplest form of my prior invention is depicted. Only one powered receptacle 21 (a 120 VAC receptacle) is shown for simplicity. When a load, such as an electric saw, is plugged into the receptacle 21, an electrical path is formed from the positive side of battery 29, through the base of Transistor T1, through resistor R2, through contacts 6,5 of power relay 23', to ground, and returned to the negative side of battery 29. This turns on T1 which applies battery power to starter solenoid 23, and the engine (not shown) of the generator 27 starts. Build up of electrical power from generator 27 eventually activates power relay 23 closing contact sets 4,5 and 1,2. That is, contacts 6,5 open, contacts 5,4 close, contacts 3,2 open, and contacts 2,1 close. This routes generator power to the power receptacle 21, replacing battery power.

Under this condition, the current delivered to the load passes through current sampler 25. When the saw is turned off, the current through sampler 25 drops. This current drop is sensed, and according to a predetermined sequencing scheme, the generator is shut off, and the power relay 23 is thus de-energized reconnecting contacts 6,5 and 3,2.

Since R1 is reverse biasing the base-emitter junction of T1, T1 remains off, and the system is readied to again sense the low resistance of the saw in order to again turn on T1 and repeat the cycle. Diode D1 is provided to dissipate high voltage transients across the starter solenoid 23.

Reference is now made to FIG. 3, the block diagram of my prior invention, starting with the block 35 marked "START SENSOR AND CONTROL". Virtually all AC powered devices have DC ohmic continuity when turned on. This ohmic continuity is what is used to sense when the load is ready to receive power. In the unpowered state, the power transfer relay 33 interrupts the path between the alternator output 63 and the power to load receptacles 31 and routes the receptacle conductors which normally are connected to the alternator output 63 to the start sensor and control function 35. The start sensor and control 35 includes the circuitry to energize the starter solenoid 43 from the battery 39, and when ohmic continuity is sensed the generator 41 starts. Once the starter starts the engine, the generator/alternator starts to generate power and the power transfer relay 33 is pulled in, which disables the start circuitry and energizes the load. There is a slight delay in interrupting the operation of the starter after the power transfer relay 33 pulls in, in order to make sure the engine is running properly to prevent stalling when it is cold. This is represented by the block 37 marked "CRANK STOP DELAY". This prevents undesirable startup cycling, where the electric power load would be sensed and the engine started; and when the power transfer relay 33 energized, the starter would cut off, the engine would stall, the relay 33 would drop out, the starter would start again and sometimes it would take several false starts to actually get the generator into operation.

Once power is flowing, the generator operates as if the controller did not exist. The current sampler block 45 between the alternator 41 and the relay 33 samples the current drawn by the load, so the controller will know when the load is interrupted. Since the current sampler is taken from a power line with a voltage of at least 120 V AC, some sort of voltage isolation must be provided between the current sampler 45 and the electronics to which the sample is fed.

The output of the current sampler 45 goes to the missing power detector block 73 and as long as power is being used, the generator operates without the assistance of the controller. If the power to the load is switched off (e.g., the powered device is turned off), the missing power detector immediately senses the loss of load and starts the stop delay timer 75 timing out. The purpose of the stop delay timer 75 is to delay the stopping of the engine after the load is removed to allow the user to complete operations which he might need to accomplish before he uses power again. When the stop delay timer 75 times out, the stop timer 77 is started. The variable time delay control 79 on the stop delay timer 75 allows the user to set the timeout time to suit his own purposes.

If the load is again reconnected before timeout is complete, the output of the missing power detector again produces output which is fed through the reset line 81 and resets the timers 75, 77 to the untriggered condition. The aborting of a timeout is an important function, because the only reason for the delay is to give the user a chance to reapply power before the engine stops. This increases efficiency and reduces wear and tear on the generator.

The stop timer 77 produces an output which causes those operations which are necessary to stop the engine. This output 87 must be preset for a period which is longer than it takes the engine to stop. Some engines take longer to stop than others.

The function of the kill switch 71 is to stop the engine. In the simplest case it can be a switch or relay connected across the coil primary of the engine shorting the coil and eliminating the ignition spark. Engines may also be stopped by a fuel shutoff solenoid valve or a combination of the two methods.

There is also another function required which is not obvious at first glance. In the process of stopping the engine, when the alternator output voltage diminishes to about 70 volts, the power transfer relay opens. In one version of the controller, the controller received its DC power through an auxiliary contact on the power transfer relay 33. Since the kill switch is electronic, when the relay 33 opened in the process of stopping the engine the controller lost power, the kill switch stop circuit 71 stopped operating and the engine started up again, went back into a stop sequence, timed out and shut down, in an endless sequence. To prevent this, an improved design contains an electronic power switch 69 which maintains controller power through the end of the stop sequence, even after the relay 33 opens. The power switch 69 has two activating inputs. The first input 65 is the closure of the power relay 33, and the second input 87 is the output of the stop timer. As long as the stop timer output is high, there will be DC power applied to the controller electronics on line 89, and this lasts until after the engine actually stops.

It should be noted that without the delay in starter cutoff after the relay is energized and the delay in interrupting the controller DC power during the stop sequence after the power relay opens, the system would have two unconditional instabilities which would render it useless.

To review the operational process of the controller of FIG. 3, reference is made to the waveform function diagram of FIG. 4. Each one of the lines of the figure represents the function named to the left. During the quiescent period denoted by waveform 103, nothing is happening. When the load circuit is turned on at point A as shown by waveform 101, the generator begins to crank (waveform 99). The time to crank depends on whether the engine is hot. It is to be noted that the cranking period extends a short time after the power is supplied to the load (waveform 97) to prevent stalling. Power is applied at point B and continues to be supplied to the load until it is turned off at point C. At this point, power is still available through power transfer relay 33, but the load is turned off, so timeout starts (waveform 93) and continues to point D when the load is again turned on and the timeout is aborted. The load is again turned off at point E starting a timeout that is complete at point F. The stop timer circuit 77 then becomes active, stopping the engine. Notice that the main power transfer relay 33 drops out at point G, but the stop circuit stays active until point H at which point the engine has completely stopped.

Reference is now made to the schematic of FIG. 5, starting with the block marked "START SENSOR" 35. When resistor R1 is grounded through contacts 3 and 7 of relay 33, due to the relatively small resistance of the load, Q1 turns on and energizes the starter solenoid 43. That is, when the power switch of the load connected to the 120 V power receptacle 31 is turned on, the hot terminal 31 of the 120 V power receptacle is connected through relay contacts 3 and 7 to R1. The neutral N of the 120 V receptacle connects through auxiliary relay contact AA to AC and to frame ground. This energizes the start solenoid 43 which results in the engine starting. If one desires to use a 240 V load and turns on the switch of a load connected to the 240 V receptacle 31, one hot terminal 31' of the 240 V receptacle goes through relay contacts 3 and 7 to R1. The other hot terminal 31" of the receptacle 31 goes through contacts 4 and 8 to ground which also starts the engine. The function of resistor R2 is to limit the current to the base of Q1 (thereby limiting its gain) which is a Darlington power transistor with a beta of over 2000. The value of R2 and the ratio of R2 to R1 set the sensitivity of the start sensor 35. The larger the value of R2 and the smaller the value of R1, the greater the sensitivity. A value of 75 ohms for R2 works well. The function of diode D2 is to protect Q1 from inductive flyback transients.

Once the starter starts the engine, the alternator 41 (FIG. 3) starts to generate power, and the relay 33 is energized by the generated power. This disables the start circuitry and energizes the load. The capacitor, C1, keeps the starter going for a short period after the relay 33 pulls in to prevent stalling under cold or long term start conditions.

Once power is flowing, the generator 41 operates as if the controller did not exist. The "CURRENT SAMPLER" block 45 between the alternator 41 (not shown in FIG. 5, but reference FIG. 3) and the relay 33 samples the current drawn by the load so the controller will know when the load is interrupted. In one embodiment, a current operated relay 46 as shown in FIG. 5 may be used. Several of the generators presently sold by Honda, Yamaha, and Makita under their various trade names have features in which the engine reduces speed to a fast idle when the load is removed. The removal of the load is sensed by what is termed a current operated relay 46. Honda calls the unit in their model EM5000SX an "Auto Throttle Controller" 44. It is a sealed unit which is supplied with DC power, and the AC power conductors from which the current is to be sensed, loop through a magnetic core 42 protruding from the unit. It should be noted that on FIG. 5 the two AC conductors loop through the core 42 in different directions from the source. The reason for this is that the instantaneous polarities of the two branch circuits of the alternator are opposite. When the sampled current falls below a threshold point (indicating a power of somewhat less than 100 watts), contact is made within the unit to apply DC to an external solenoid 44. When activated, the solenoid plunger presses against a part of the engine governor linkage and slows the engine down from the normal 3600 rpm to about 2200 rpm. The voltage isolation between the high voltage AC power conductors and the electronics is provided in this case by the wire insulation on the conductor which is routed through the magnetic core.

In the embodiment shown, the existing auto throttle controller switch closure (not shown) within the sealed AC current relay 46 is used to energize the solenoid 44 to slow the engine down when the load is removed and to also signal the controller that power flow has stopped. The auto throttle controller switch within AC current relay 46 is arranged so that the negative side 40b of the solenoid power is switched to connect with the negative side 40a of the power source, and the positive side is always connected to the + of the power source.

Reference is made to the block in FIG. 5 labeled "MISSING POWER DETECTOR" 73. The input of a CMOS Schmidt trigger, UA1 inverter, through a noise filter consisting of R23 and C16 is connected to the negative side of the solenoid 44. When the solenoid 44 is not operating, the inverter UA1 receives a high input through the solenoid 44, and its output is low. When the solenoid 44 is energized, the inverter UA1 input goes low and its output goes high. The output of UA1 is connected to a second inverter UA2. When the solenoid 44 energizes, the output of UA2 goes low and triggers the stop delay timer U4, through C9, and starts the timeout process. The stop delay timer 75 in this design uses a 555/556 type IC analog timer U4. Other types of timers, including digital timers, may be used. Timer U4 produces a positive going output during the timeout period of which the negative going trailing edge can trigger a second timer, stop timer 77. The delay period of U4 is established by C10 and a combination of resistance of R19, R20, R21, and R22 and the setting of dip switches S1, S2, and S3. With a 10 $\mu f$ capacitor for C10 and three dip switches, with resistors proportioned binaurally and a 0.75 M$\Omega$ resistor R19 always in the circuit, one can achieve nominal delays of 8, 25, 41, 58, 74, 91, 107, and 126 seconds of delay. One minute has been found to be a practical time in actual usage.

If the load is connected again before timeout is complete, the output of UA1 goes low again and is coupled to the reset bus of U4 and U5 through C18 to abort the timing sequence.

It should be noted that the common power lead of the Auto-Throttle system 45 is coupled to the ground of the controller with a capacitor C15. This is because the Auto Throttle solenoid 44 is powered by a battery charger output of the generator 41 which is isolated from the frame ground. The inverters UA1 and UA2 are also powered by this source (on line 89), therefore the output pulses must be coupled capacitively.

The stop timer is another timer U5 similar to the stop delay timer U4. It is triggered by the stop delay timer output 83 and produces an output signal for a period as long as it takes to stop the engine. Its output is connected to the input of the kill switch 71.

The function of the kill switch 71 is to stop the generator engine. In the simplest case, it can be a small (TO-92 case) triac thyristor U9 with its main terminals connected across the coil primary 47 and triggered continuously during the stop sequence by the kill switch stop timer 77. If triggered, it functions to fire each time a voltage appears across it, shorting the coil and eliminating the ignition spark. The component arrangement of the kill switch optical isolator U6 and the triac U9 itself is a circuit recommended by the Motorola data book for inductive loads except that C2 had to be drastically reduced in value because of the higher dv/dt of the coil pulses. Some of the more sophisticated generators also incorporate a fuel cutoff solenoid (not shown) powered from a source isolated from frame ground. In this case, the stop timer 77 drives two opto-isolators U6, U7 with triac outputs U9, U8 with their input LEDs in series, driven by the output of the stop timer 77. One isolator output then drives the coil shorting triac U9 and the other drives an SCR U8 which energizes the fuel cutoff solenoid over lines 48, 48' for the duration of the stop sequence. The SCR circuit is straightforward. The opto isolators U6, U7 isolate the wiring of the two thyristors U9, U8 from frame ground so there is no undesirable interaction between the power source for the fuel value solenoid and frame ground. In generators which have no fuel cutoff solenoid, the second opto-isolator and the SCR are eliminated.

The controller power switch 69 operates as follows, referencing FIG. 5 for the schematic of the switch. It is composed of Q2, Q3, R3, R4, R5, and R6. The generator controller of my prior invention becomes active when the alternator starts producing power and the relay 33 is energized. At this time, relay contacts AB and AC close, and the junction of R4 and the collector of Q3 is grounded. This causes current from the battery 39 to flow into the emitter of Q2 out the base, through R4 to ground, turning on Q2 and powering up the controller with battery power. When the stop timer output 87 goes high and the stop sequence begins, Q3 is saturated by current from the output of stop timer 77. This means that as long as the stop timer output 87 is high, Q3 will be saturated and the controller will be powered up, even after the relay 33 has opened and R4 ungrounded by its contacts. The two transistors Q2 and Q3 are low speed switches with betas of about 100. The controller uses a maximum current of 60 ma.

Current Sensing using a Diode Shunt as an Alternative to a Current Operated Switch in U.S. Pat. No. 5,561,330

As an alternate to sensing current with a current operated relay as shown in FIG. 5, a version of the controller has been developed using a diode as a current shunt, referencing FIG. 6. Except for the method of current sampling and the detection of loss of power flow, this version of the controller is identical with the first one described in connection with FIG. 5.

A diode is a nonlinear element in which the voltage across it changes very little as the current through it changes. From a few milliamperes to 25 amperes, the voltage drop across a diode changes from about 0.55 V to 0.8 V. For indicating the flow of AC current, a pair of diodes connected in parallel in opposite directions may be used. It was found that an excellent shunt which would serve the purpose of the controller according to my prior invention could be made consisting of a 25 amp. full wave bridge rectifier with the + and − terminals connected together to form one terminal of the shunt, and the AC terminals connected together to form the other terminal. Connected in this manner it is equivalent to two diodes in parallel in each direction. This provides a convenient economical, easily available package that can be heat sunk. The output signal across the shunt is a power frequency square wave with rounded corners. In the embodiment of FIG. 6, the shunt diode is labeled D1.

Referring to FIG. 6, in this design, the voltage drop across the diode shunt D1 is coupled to the missing power detector 73 through a 1:5 step-up auto transformer T1 to an optical isolator U1. The optical isolator U1 serves to isolate the controller from the high voltage power. The transformer T1 is used to step up the voltage from the diode, which can be as low as 0.5 V, to a voltage which will operate the LED in optical isolator U1. This ratio is not critical as long as the output is large enough to operate the isolator LED.

If this signal can be detected with a "signal presence" or "power failure" detector, it will be known if there is a load present on the generator. One means of detecting the absence of power flow is to sense the loss of the AC waveform. The circuit used in this version of the controller is a modification of a power failure detector described by George Jung on Page 296 of his book, "IC Timer Cookbook", 2nd Edition, (Sams, 1990). In this circuit the input from the power flow sample is fed through the optical isolator U1. The output of U1 is fed to U2 which is an inverted one shot which produces a 2 ms negative output pulse every cycle of the 60 Hz power (16.67 ms). The output of U2 triggers a second one shot U3 which is retriggerable. The timeout period of U3 is greater than about 20 ms, so that as long as the 60 Hz power is present U2 produces 2 ms pulses for each cycle of the power frequency, the second one shot will retrigger each 16.67 ms and never time out. If the power sample disappears and U3 misses a pulse it will time out and its output will go low, indicating that the AC signal is absent and the power flow has stopped. When this happens its output triggers the stop delay timer 75.

By connecting the "reset" pins of U4 and U5 to the negative output of U2 and pulling it up to the + supply with a resistor R16, U4 and U5 are both reset and abort any timeout sequence as soon as U2 produces its first pulse after the load is again turned on, if this happens before the timeout of U4.

An Alternate Configuration using Diode Shunt Sensing which uses an Amplifier instead of a Transformer in U.S. Pat. No. 5,561,330

FIG. 7 shows my prior configuration in which an amplifier A1 is used in place of the transformer (T1 of FIG. 6) to increase the shunt voltage to a level which will operate the optical isolator U1. The common "ground" of the amplifier A1 is connected directly to the 120 V AC "hot" terminal "X", and so the amplifier A1 must be isolated from frame ground, as must its DC power supply. The power supply consists of a 0.47 $\mu f$ AC voltage dropping capacitor C20, two diodes D20 and D21, a zener diode Z1, and a filter capacitor C21. There is no IR loss in the voltage dropping capacitor C20 and consequently no dissipated heat.

The amplifier A1 is a fixed gain audio power amplifier so the gain is adjusted by the ratio of the input resistors R30 and R31. The output of the amplifier A1 drives the input LED of the optical isolator U1. The shunt diode pair is again shown as D1. The amplifier gain and current are adjusted so that there is an output from the phototransistor of U1 for only a small part of a cycle when the AC power is loaded with a minimum value. UA1 through UA4 are Schmidt trigger inverters. The output of the first and second inverters UA1 and UA2 is a pulse at line frequency. The diode D2 at the output of UA2 rectifies the pulse to charge C16. The time constant is set so that the input of UA3 is high all the time with a minimum AC load. The output of UA4 stays high with minimum and higher load. When the load is removed, it goes low and starts the timeout process. If however, the load returns before timeout of the stop delay timer, the output of UA3 goes low again, resetting both timers. The remainder of the system is substantially the same as with the configuration of FIGS. 5 and 6.

SUMMARY OF THE INVENTION

The present invention provides improvements over my prior '330 patent. In particular, there is provided a controller for controlling the operation of an electric power generator as a function of load demand, the electric power generator producing a 240V AC output and first and second 120V AC outputs developed from the 240V AC output relative to a neutral, the controller comprising: a manual switch switchable between a first position and a second position; sensing means for sensing the presence and absence of a load on both the first and second 120V outputs of the electric power generator's output when the manual switch is in the first position, and for sensing the presence and absence of a load on one of the first and second 120V outputs and the 240V AC output when the switch is in the second position; and activating means for directly activating the electric power generator responsive to the sensing means sensing the presence of a load.

In another aspect of the invention, there is provided a controller for controlling the operation of an electric power generator as a function of load demand, comprising: a power transfer relay having normally open relay contacts which interrupt the path of AC voltage generated by the electric power generator prior to being applied to a load, the contacts closing when the power transfer relay is operated to connect electric power generated by the electric power generator to the load when the power transfer relay is enabled; and an AC-to-DC converter for developing a DC control voltage from an AC voltage output from the electric power generator, the DC control voltage being applied to operate the power transfer relay when the DC control voltage reaches an enabling threshold.

In a further aspect of the invention, there is provided a controller for controlling the operation of an electric power generator driven by a gasoline engine as a function of a load demand, comprising: a start solenoid; a start sensor including a transistor connected between the start solenoid and the load, whereby the presence of a load turns on the transistor, enabling the start solenoid to start the engine, the transistor having an emitter, a collector, and a base, the start sensor further comprising a constant current generator coupled between the emitter and the base for desensitizing the start sensor to variations in the resistance of the external load connected during the starting sequence.

In yet another aspect of the invention, there is provided a controller for controlling the operation of an electric power generator driven by a gasoline engine as a function of a load demand, comprising: sensing means for sensing the presence and absence of a load on the electric power generator output; activating means for directly activating the electric power generator responsive to the sensing means sensing the load presence; and an alarm arrangement coupled to the sensing means for preventing automatic starting of the electric power generator when the engine stops because it runs out of fuel, has low oil, or exhibits other operating malfunction.

In yet a further aspect of the invention, there is provided a controller for controlling the operation of an electric power generator driven by a gasoline engine as a function of a load demand, comprising: sensing means for sensing the presence and absence of a load on the electric power generator output; activating means for directly activating the electric power generator responsive to the sensing means sensing the load presence; an ignition coil primary; a start solenoid; a fuel cutoff solenoid; and stopping means for stopping operation of the electric power generator responsive to the sensing means sensing the absence of a load on the electric power generator, the stopping means comprising a magnetic latching relay for shorting the ignition coil primary.

The present invention can easily be adapted to any electric power generating source to control the operation of the generator dependent upon the nature of the load demand. For example, future electric power sources will include nuclear reactors, controlled fission/fusion processes, and the like. Thus, although a gasoline engine driven electric power generator is exemplary of the type of generator my prior invention and the present invention can control, it is to be understood that the present invention is not so limited and can be employed in any electric power generating system in which the power generator is to be shut off, put into an idle mode, or otherwise affected responsive to the demand for electric power output demand.

BRIEF DESCRIPTION OF THE DRAWINGS

The invention will now be described in detail, having reference to the accompanying drawings in which.

DETAILED DESCRIPTION OF THE PREFERRED EMBODIMENTS

The present invention covers additional refinements of the controller developed after the application for my prior U.S. Pat. No. 5,561,330 (hereinafter '330 patent) was filed. Some of the changes are added to improve the performance of the controller, and others are intended to ensure against improper operation in the event of certain unusual combinations of events and environment, or to stabilize potentially unstable conditions.

The basic functions and operational sequence of the controller has not changed from my prior invention. The additions and modifications presented herein serve to improve its performance and limit possible failure loads.

It was discovered during testing of my prior invention that, when the generator engine stopped while under load without being commanded to stop by the controller, for reasons such as running out of fuel, or by the low oil cutout, major controller damage can occur. This damage results from arc bridging of the main power relay contacts 5, 6 of power transfer relay 33. The arcing occurred as the AC powered relay 33 opened and closed when the loaded generator output voltage dropped to a critical value as the disabled engine slows to a stop. The bridging of the relay contacts 5, 6 causes the AC power to be applied to the low voltage DC control circuitry. Corrective protective measures to prevent this have been devised. This includes changing the AC powered relay to a direct current operated relay which cannot buzz or chatter. Surge protection was also added to the normally closed contacts of both AC power branches connected to the control circuitry.

A switch and associated circuitry has been added which provides for the load sense circuit to select either the 120V "X" branch and 240V output, or both 120V "X" and "Y" branches for sensing the presence of a load to start.

Figure 6:
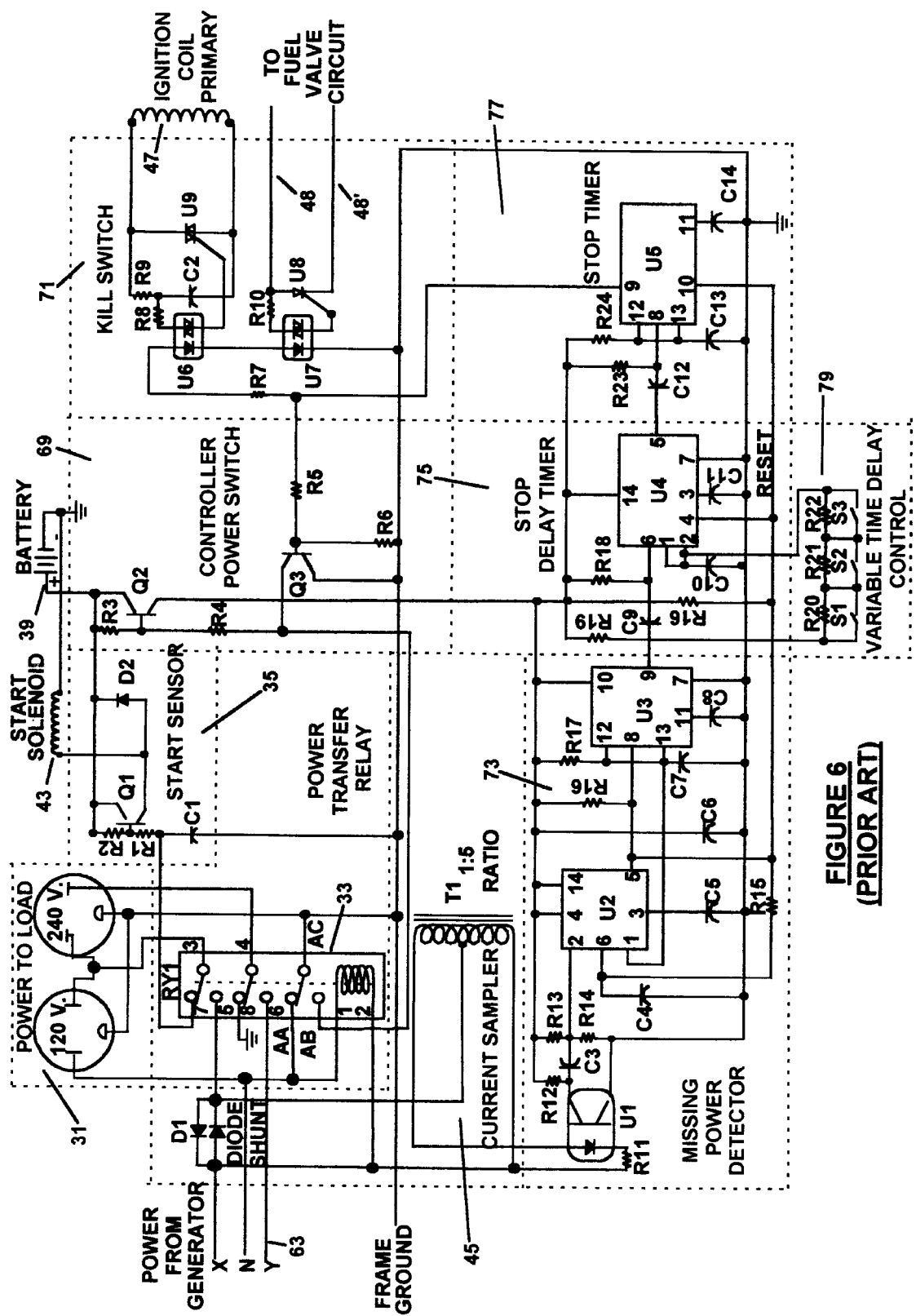
FIG. 6 is an electronic schematic diagram of the functioning of a second preferred embodiment of a controller according to my prior invention using a diode shunt to sense current.
Figure 7:
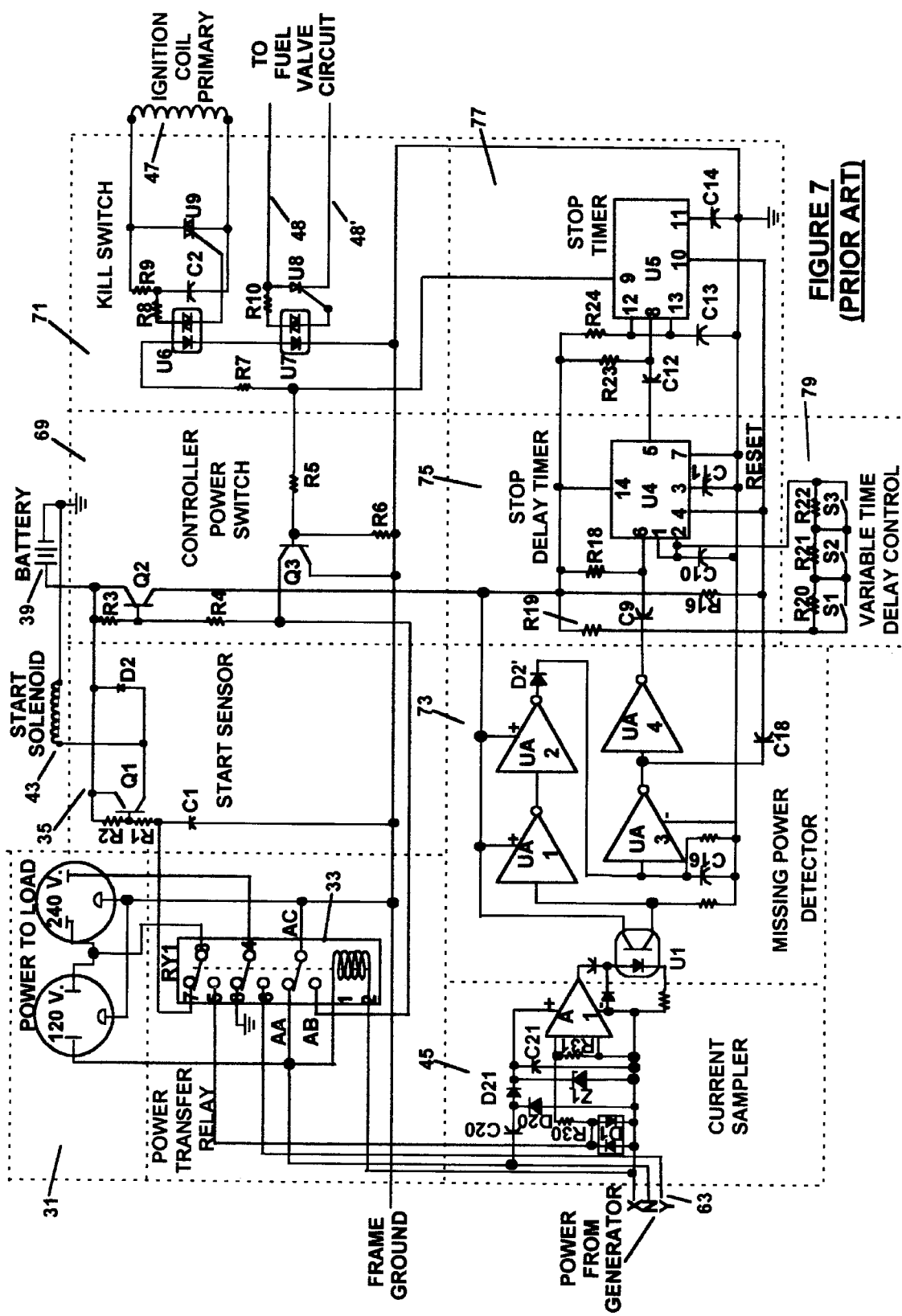
FIG. 7 is an electronic schematic diagram of the functioning of a third second preferred embodiment of a controller according to my prior invention using a diode shunt to sense current without a transformer.

It was found that by replacing the sense resistor (R2 in FIGS. 5, 6, and 7 of my prior '330 patent) with a small (TO92) integrated circuit voltage regulator configured as a 20 to 40 milliamp current regulator, the sense circuit is much less sensitive to variation in the resistance of the external load connected during the starting sequence. This makes starting more reliable regardless of conditions.

A new more positive method of starter cutoff delay has been developed using an integrated circuit timer.

An "ALARM" state has been added to the controller, so that when dangerous conditions arise which make it unsafe or undesirable for the controller to operate normally, the sense lead is opened to prevent automatic starting, the power is removed from the controller, and a large LED light flashes until the alarm is reset. This prevents auto-start attempts when the engine stops because it runs out of fuel, is low on oil, or exhibits other malfunction. The flashing red LED indicates that the alarm state is active.

The cranking time has been limited to ensure that the engine will not crank indefinitely if the engine fails to start in a reasonable time. If the engine does not start by the time this limit is reached, the controller switches to the ALARM state and ceases to crank.

A new version of the stop circuit has been developed, replacing six semiconductor components and six resistors with a single magnetic latching relay.

For the sake of operator convenience, an AUTO-MANUAL switch has been added to the controller, allowing the user to use the generator in the MANUAL mode by simply setting a switch in that position. A manual START-STOP switch is provided for starting and stopping the generator. In the stop process, both the ignition coil is shorted and the fuel cutoff solenoid is activated. This prevents fuel combustion in the hot muffler which causes small "pops" as the fuel burns. In order to take advantage of the safety features provided by the ALARM state, the generator will not start with the ALARM active even in the MANUAL mode.

In order to maintain control when the engine fails for any reason (e.g. running out of fuel, a low oil cutoff, or a major breakdown), the engine failure must be detected and distinguished from a commanded stop. The engine failure detector must not sense the idle speed as an engine failure, i.e., it must distinguish between an engine failure and an ordered stop due to lack of load after a predetermined time out. The present invention provides such an engine failure detector which also keeps the controller from trying to crank the failed engine.

Figure 1:
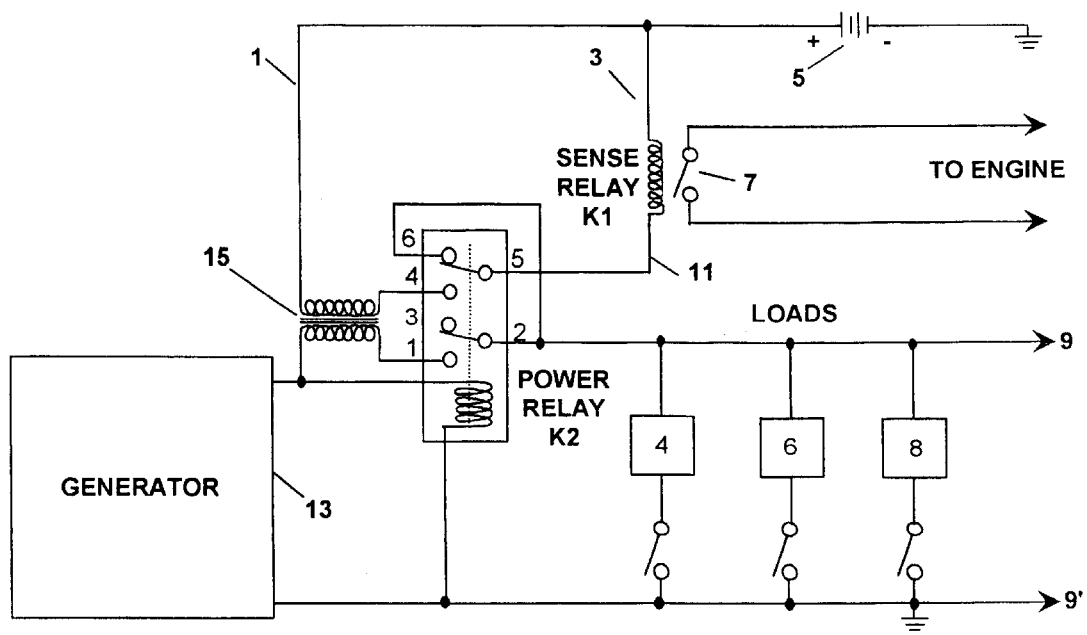
FIG. 1 is a simplified schematic diagram of the electrical components of a prior art controller for a gasoline engine driven electric power generator.
Figure 2:
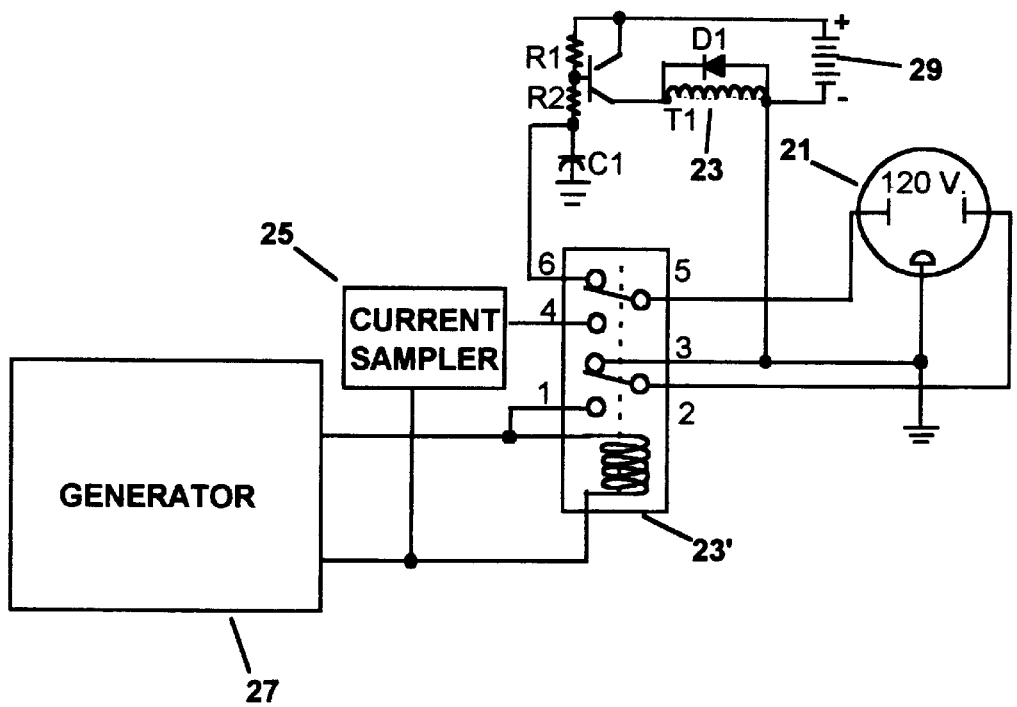
FIG. 2 is a simple embodiment of the basic controller for a gasoline engine driven electric power generator according to my prior invention.
Figure 3:
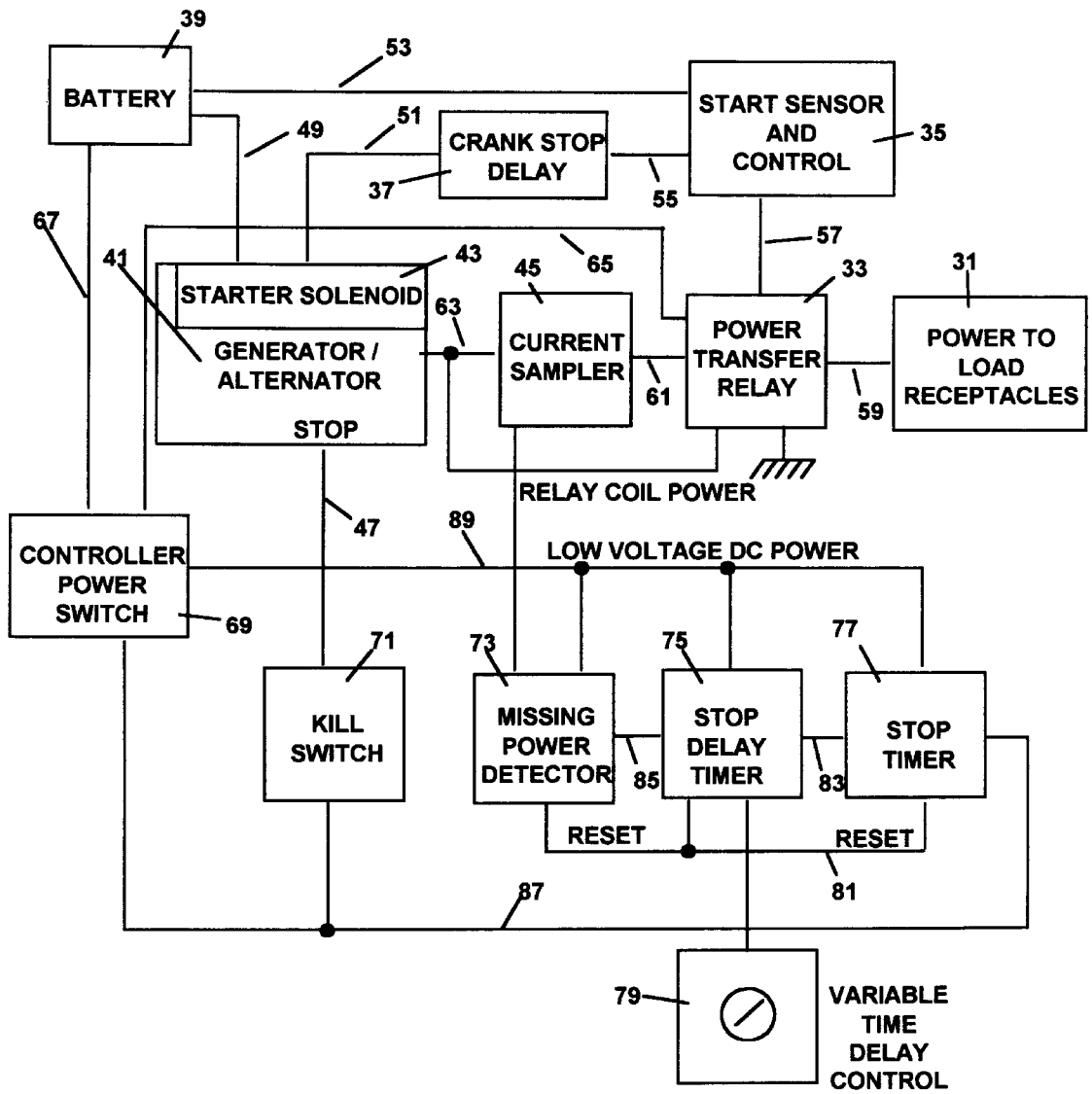
FIG. 3 is an electronic block diagram of the functioning of one embodiment of the controller according to my prior invention.
Figure 4:
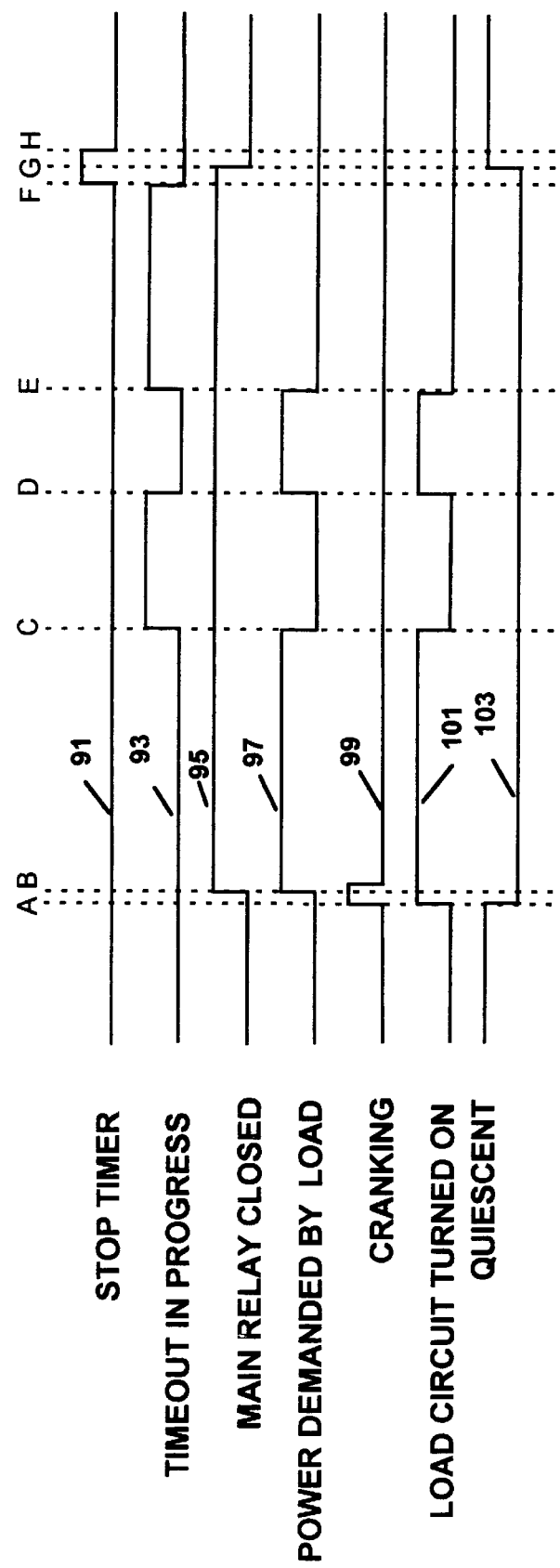
FIG. 4 is a function diagram of my prior invention showing the sequencing of major operational events in the starting up, maintaining, and shutting off of the generator.
Figure 5:
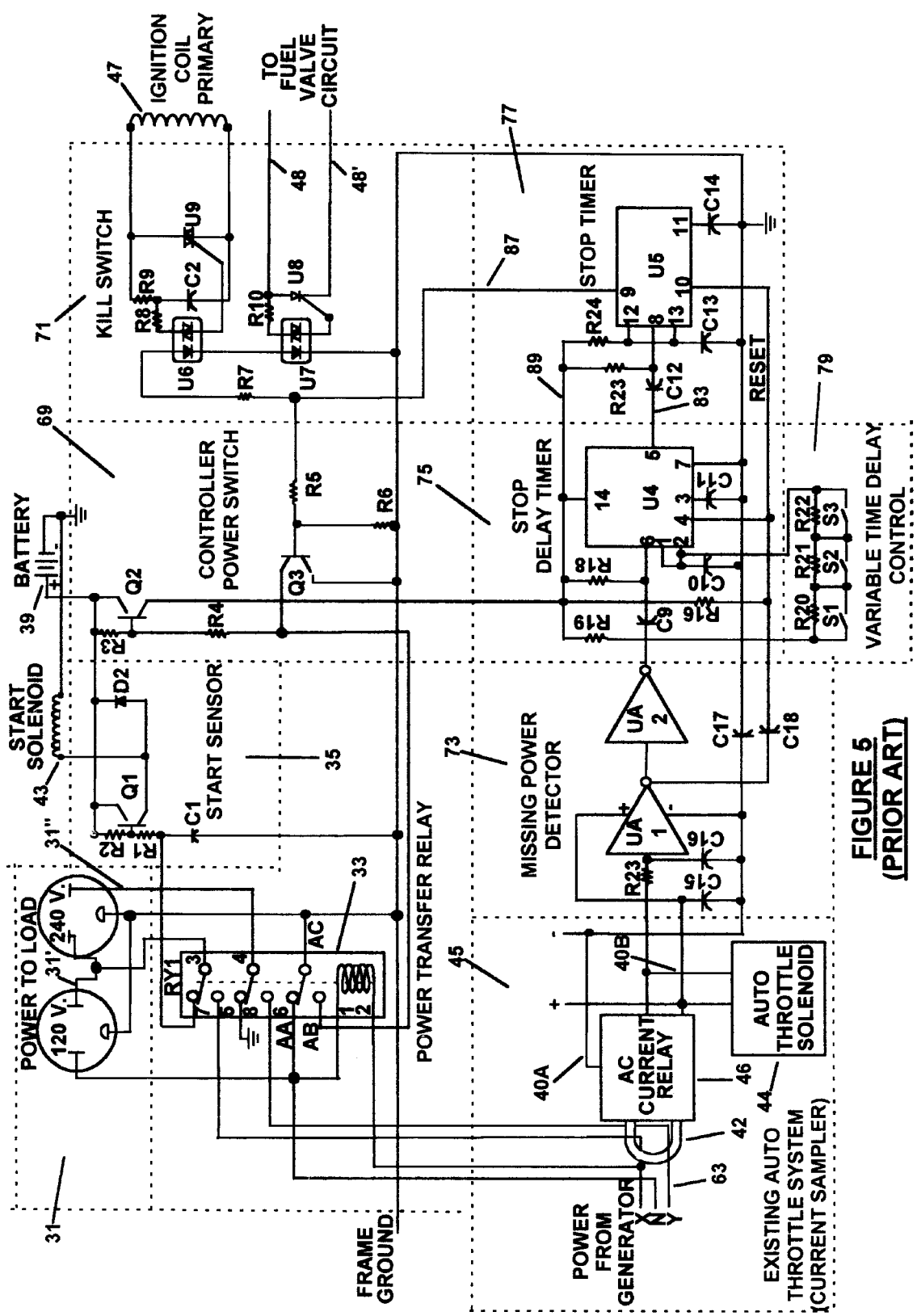
FIG. 5 is an electronic schematic diagram of the functioning of a first preferred embodiment of a controller according to my prior invention using a current relay to sense current.

For the description below, reference is made to FIGS. 8 and 9 which show new composite schematics based on FIG. 5 of my prior '330 patent, to which have been added the new features presented hereinafter. Even though a modified FIG. 5 from my '330 patent was chosen for the presentation of these new developments, they could just as well be applied to any of the other configurations shown and described in that patent.

Figure 8:
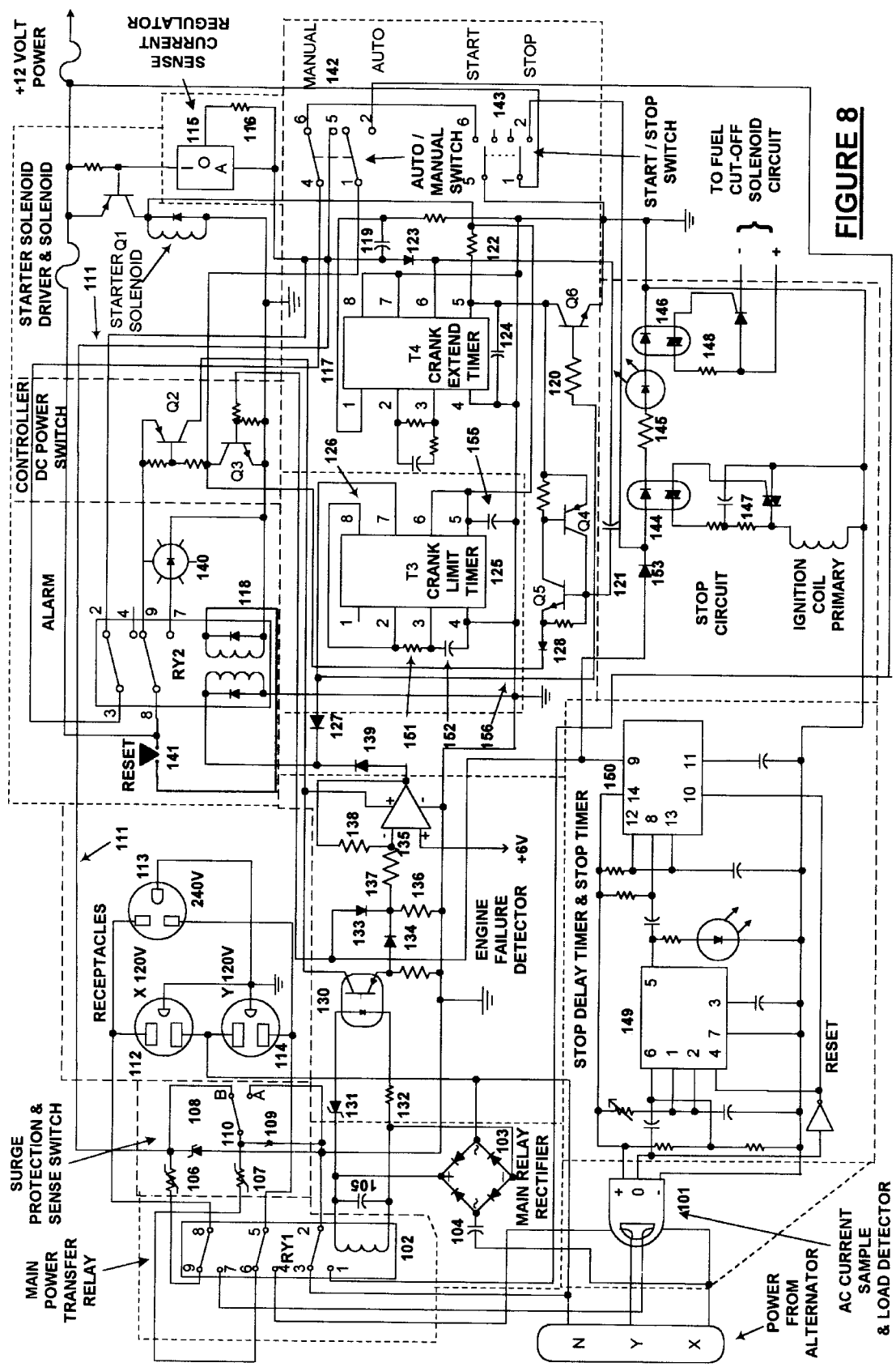
FIG. 8 is an electronic schematic diagram of the functioning of a first preferred embodiment of a controller according to the present invention.
Figure 9:
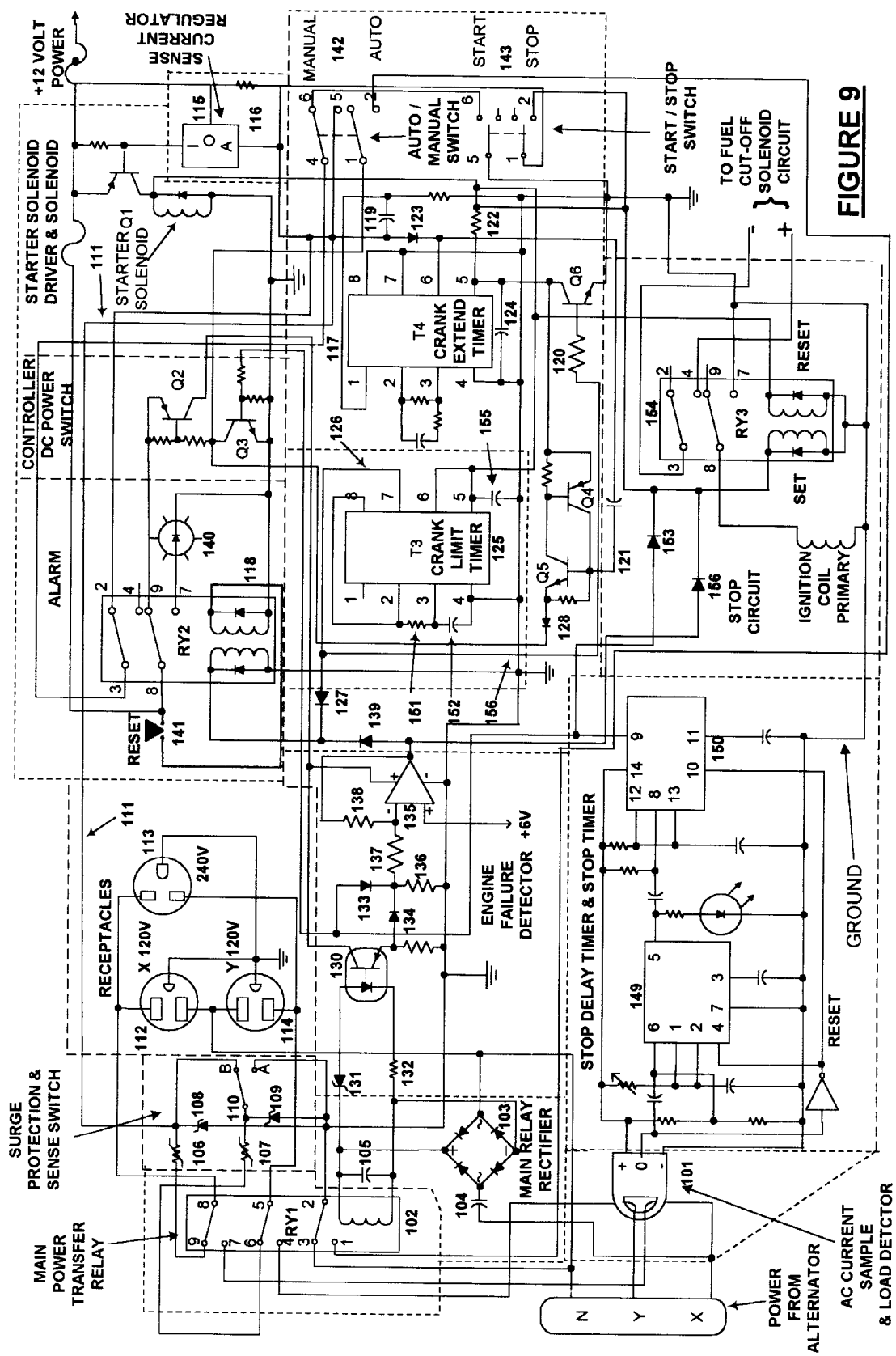
FIG. 9 is an electronic schematic diagram of the functioning of a second preferred embodiment of a controller according to the present invention with changes in the DC power switch and stop circuit relative to FIG. 8.

As seen in FIGS. 8 and 9, the components and circuitry in each of the various subsystem blocks of the new configuration of the controller have been separated by dashed lines, the function of each of which is labeled. The alternator is not shown in this drawing, and the AC power from the alternator is shown at 195 entering the lower left of the drawing, looping through the AC current relay 101. This relay is equivalent to relay 46 in FIG. 5 of my prior '330 patent, and has an output which goes high when the current drawn is over the minimum threshold of current. This output is inverted by invertor 194 and set to the reset line 196 of the stop delay timer 149 and stop timer 150. The operation of these components of the controller have been described in detail above in connection with FIG. 5.

Eliminating Repeated Changes in State of the Main Power Transfer Relay by Replacing the AC Powered Relay With a DC Powered Relay AC relays are intended to be used with the rated AC coil voltage, and if the coil voltage decreases to near the pull-in voltage, the relay "buzzes". That is, it repeatedly changes state at the power frequency rate. In the original configuration of the controller, when the AC power circuit is heavily loaded and the relay 33 (FIG. 5) buzzes, arcs develop across the swinger and normally opened contacts 5, 6 to the extent that the normally closed contacts 7, 8 are electrically bridged to the normally opened contacts 5, 6. This connects the AC power to the low voltage control circuitry of the system which can destroy that circuitry.

DC relays, on the other hand, are very well behaved and typically close at about ¾ of their rated voltage and open at about ¼ of the closing voltage. The characteristic hysteresis of a DC relay prevents it from ever making multiple open-close cycles as the voltage is changed slowly. It has been determined that, for a typical 120V AC relay of this power range, the coil will also operate satisfactorily on 24 V DC. The 24 V DC can be provided from the 120V AC line (e.g. from terminals N, X) from the alternator power input 195 by using a full wave rectifier 103 with a small (1 to 1.8 microfarad) voltage dropping capacitor 104 in series with the 120V AC power lead "X" and a small electrolytic capacitor 105 across the DC output to smooth the ripple. The ripple must be reduced to the extent that it cannot cause buzzing of the relay. It was also found that the operating volt-amps of a relay operated in this manner is about the same as when powering the coil from AC. A 48 V DC relay also may operate well with the DC supplied in this manner. For a 60Hz supply, the required capacitance is found by: $C=1/(377*V)$, where V is the required impedance to drop the voltage from 120V so that the rectified smoothed voltage to the relay coil 102 will be correct at the required current.

Referring to the block labeled MAIN RELAY RECTIFIER 198, in FIGS. 8 and 9, the coil of relay 102 is powered by the output of the full wave rectifier 103 into which AC power is fed through the voltage dropping capacitor 104 from one 120V AC branch (X) of the generator output 195 connected before the current sensing relay 101. The other AC terminal of the rectifier 103 is connected to the neutral (N) power conductor. The rectifier output ripple is smoothed by capacitor 105. The resulting combination causes the relay 102 to pull in when the AC voltage is at about 90 V AC and drops out when the AC voltage is at about 20 V AC, which will eliminate any problem from state changes by the relay.

Added Surge Protection

As a safety measure to protect the electronics from arcs bridging the relay contacts, a protective network has been installed in each of the sense leads connected to the normally closed contacts 9 and 6 of the main power transfer relay 102. Referring to the block labeled SURGE PROTECTION & SENSE SWITCH, each network consists of an organic positive temperature coefficient thermistor 106, 107, made by the Raychem Corp. with the trademark of "PolySwitch", in series with the sense leads and a 15 volt surge suppressor type zener diode 108, 109 shunted from the output of the PolySwitch 106, 107 to ground. The PolySwitches 106, 107 in the above referenced block were developed to provide protection from lightening stroke effects in telecommunication circuits. If the current through the PolySwitch 106, 107 builds to any significant magnitude above normal, the PolySwitch series resistance changes from less than ten ohms to a very high value within microseconds, and it will do this repeatedly without degrading the electronics to which it is connected. The 15V protective zener diodes 108, 109 which are connected from the outputs of the PolySwitches 106, 107 to ground will prevent the output voltage of each network from exceeding +17 V or –0.75 V.

An Improved Sense Circuit Which Will Sense a Load Connected to Either the 120V, "X" Branch and the 240V Total as One Option, and Both 120V, "X", and "Y" Branches as Another The arrangement of sensing loads shown in my '330 patent will sense a load to crank the generator engine on only the 120V "XX" branch, or across the 240V receptacle. This means that, if a load is plugged into the receptacle for the 120V "X" branch, or if a load is plugged into the 240V receptacle, then the engine will start. A load connected to the 120V "Y" branch will not start the engine. This is somewhat limiting. An improved arrangement is shown in FIGS. 8 and 9 in which the operator has the choice of sensing on either the original 120V "X" branch and 240V source or, as another option, across either of the 120V "X" or "Y" branches.

Referring to the SURGE PROTECTION & SENSE SWITCH block 181, the switch 110 allows selecting between positions A and B. Position A allows starting to occur when a load is applied to the 120V "X" branch or 240V as in my prior invention. In order for the starter solenoid driver Q1 to energize the solenoid 186, there must be a path from the base of transistor Q1 through the sense lead 111 to ground. In the stopped state, the power neutral (N) is grounded through contacts 2 and 3 of relay 102, as in my prior invention. In position A of switch 110, the normally closed relay contact 6 for the "Y" branch is grounded. Following wire 111, a path is completed through PolySwitch 106 to relay contact 9, through contact 8, to the hot side of the "X" branch receptacle 112, and through the load to neutral (N) which is grounded in the quiescent state. Alternatively, the path routes through PolySwitch 106 to contact 9, through contact 8 to the top contact of the 240V receptacle 113, through the 240V load to the other 240V conductor, through contact 5, through contact 6, through PolySwitch 107, and through the selector switch position A to ground.

If the switch is in the B position, this simply ties both of the normally closed contacts 9 and 6 together, i.e. starting from wire 111, through PolySwitch 106 to contact 9 through contact 8 to the hot contact of the 120V "X" branch receptacle 112, and through the load to neutral which is grounded. Alternatively, the path may route from wire 111 through contact B on the selector switch 110 to PolySwitch 107, to relay contact 6, to contact 5, to the hot lead of the "Y" branch 120V receptacle 114, and through the load to neutral which is grounded. It should be noted that, in position B, the back contacts 6 and 9 of both main power branches are connected together through the PolySwitches 106 and 107 and the surge suppressors 108 and 109. If there was an active arc across both back contacts 6 and 9 at the same time, without the protective networks, there would be a direct short across the 240V line.

Replacing the Sense Resistor With a Current Regulator

In starting the generator through the controller, the first action which takes place is the sensing of the load. The DC sense current travels in a path through the DC resistance of the AC powered load. The DC resistance of the load before starting has no direct relationship to the AC power consumed while running. Tungsten lamps are resistive loads, but due to Tungsten's very high temperature coefficient of resistance, the resistance while operating is 12 to 15 times its cold non-operating resistance. The operating impedance of motor loads depends greatly on the back EMF generated by the motor, and in addition there is always an inductive component and an in-phase load power component. Some non-operating DC resistances for AC loads are listed below.

| Load | Static Resistance in Ohms |
| --- | --- |
| 100 W 120 V lamp | 12 |
| 100 W 240 V lamp | 48 |

-continued

| Load | Static Resistance in Ohms |
|---|---|
| Small drill motors | 5 to 15 |
| Electric hand saws | 5 to 15 |

Referring to the STARTER SOLENOID DRIVER AND STARTER SOLENOID BLOCK 185 in FIGS. 8 and 9, it will be noted that this function block is identical to the one in my prior '330 patent, except that, in the original circuit, a resistor was used in place of the current regulator 115. It is best to pass sufficient sense current through the load, so that at the instant the switch of the load is turned on, the starter solenoid switch transistor Q1 completely saturates. If one uses a resistor in series with the base of the switching transistor Q1, as was shown in the original design (FIG. 5), the variability of the DC resistance of the load will result in a variable current through the base-emitter junction of the transistor Q1 which varies with load sense resistance. If a constant current regulator is substituted for the resistor, the current will be substantially the same as the value at which the regulator is set and will ensure complete saturation of the switching transistor Q1.

A constant current regulator 187 may be implemented by adding a small resistor 116 to a tiny plastic (TO92) integrated voltage regulator 115, such as the type LM317L. The voltage regulator 115 has three terminals: The input marked I, the output marked O, and the adjust terminal marked A. The starter solenoid switching transistor Q1 is a PNP transistor with its emitter connected to the 12V source of DC power. In order to turn on the transistor Q1, current must flow through the base/emitter junction of the transistor Q1 to ground.

The current limiting resistor R1 used in my earlier design (FIG. 5) is replaced by the simple current regulator 115. The resistor 116 is connected between the output O and the adjust terminal A. The input is fed to the input terminal I, and the output is taken from the adjust terminal A as is shown in FIGS. 8 and 9. The current will be set to a value of 1.25/R where R is the resistance of the resistor 116 in ohms. If a resistor value of from 30 to 51 ohms is used, the resulting current will be from 40 to 24 milliamps which operates well in this case. The improved arrangement was found to operate much better than the resistor for loads with high DC resistance. With the resistor R1 of my previous design (FIG. 5), the controller started normally on a 120V 100 watt lamp bulb as a load (12 ohms DC resistance), but it was sometimes hesitant to start on a 240V, 100 watt lamp bulb (48 ohms DC resistance). With the sense current regulator 187 in the circuit, there is no discernible difference in starting.

A Crank Extend Timer Based on an Integrated Circuit Timer

The method of delaying the starter cutoff described above and in my original invention was to connect a large (4700 microfarads) capacitor C1 (FIG. 5) between the lower end of the sense resistor R1 and ground. The delay was found to change with the load. As an alternative, it was found that a much smaller capacitor (50 to 200 microfarads) connected between the base and collector of the starter solenoid driver transistor Q1 worked better; however, the delay time still depended on the load. Even through the start solenoid 43 (FIG. 5) on the generator and the one used on the development breadboard circuit for the same size and same coil resistance, the time delay was almost double on the breadboard when it was driving the breadboard solenoid as when it was driving the one on the generator. The solution to this problem is to use an integrated circuit timer for the delay. The chief problem with its use is the availability of a triggering source.

An arrangement could be built which is triggered by the turn-on of DC power as the main power relay 102 completes closing. Such a relay would take about 25 milliseconds to close. In that time, the mechanical overrunning clutch in the starter driver will uncouple, resulting in the starter continuing to spin during the timer period, but the engine may still be stalled.

The integrated circuit timer 117 used in the circuit to be described is a National Semiconductor Type LM3905. This device is considerably more versatile than other timers, because it has an option with which the designer can choose to have the output transistor (not shown) either saturated or cut off during the timing period, and the opposite when not timing out. By tying the "logic" pin to the Vref end of the LM3905 timer, the output will be saturated during the timing period, and if a logic pin is tied to ground, the output transistor will be cut off during the timing period. Since the output transistor (not shown) is "floating", the designer also has the option of taking the output from either the emitter or the collector.

Referring now to the CRANK EXTEND TIMER block 117, the design is such that the timing period is the same as the RC time constant of the timing resistor and capacitor. The period of the crank extend timer 117 is about 4 seconds. The timer 117 is configured so that it will not start a cycle when the power is applied by tying a timing resistor between the timer RC pin 3 and the Vref pin 2. The capacitor is also tied across these same pins, except it has a 1K ohm resistor in series to limit the discharge current. The logic pin 8 and the output transistor emitter of the timer are both tied to ground. The collector of the output transistor is tied to the sense line 111 through diode 123. The sense line is the conductor which draws emitter base current through the starter solenoid switch transistor Q1. Until the timer 117 is triggered, the sense line can be either high or low, but no current will flow through the timer output transistor Q1.

As the starting sequence commences, a load is sensed on the normally closed contacts 6 and 9 of the main power transfer relay 102, passing DC sense current through the protective networks 106–109 through the sense line 111. The current can be traced backwards toward its source: through contacts 5 and 4 of the AUTO/MANUAL switch 142 in the AUTO mode; through contacts 3 and 2 of the latching relay 118; to the output of the current regulator 115; from the emitter/base junction of the transistor Q1 which, when it turns on, powers up the starter solenoid 186. At the same time, it powers up the crank extend timer 117, and the crank limit timer 125. When the generator starts and energizes the main power transfer relay 102, just as the relay swinger starts to move, the sense line current is interrupted through the main power relay 102 normally closed contacts 6 and 9, and the lower end of the current regulator 187 pulls up to +12V. When this happens, a positive going pulse appears on the sense line 111, and is fed to pin 1 of the timer 117 through the capacitor 119, starting a timing sequence.

The timer 117 triggers within 0.25 microseconds. When this happens, the output transistor of the timer 117 saturates and pulls the sense line 111 to ground again, and this energizes the starter solenoid 186 until the timer period is complete. At the completion of the timer period, the output transistor of the timer 117 cuts off again, and the sense line 111 again rises up to +12V and re-triggers the timer through the capacitor 119. This time, it also triggers an NPN/PNP latch 120, through capacitor 121 into a low impedance state. The latch 120, which is a very sensitive composite of transistors to emulate a silicon controlled rectifier (SCR), which when triggered to the conducting state stays in this condition until the circuit power is removed. This shorts the timer power to ground. The timer power lead has a 1K ohm resistor 122 in series to protect the power supply.

As used in this specification, the phrase "flyback of the sense line" refers to the sense line 111 rising to +12 volts when it is ungrounded. That is, when the sense line 111 is grounded, the starter solenoid 186 and other circuits are energized by turning on the solenoid driver Q1. When the sense line is interrupted, it "flies back" to battery voltage very quickly.

The latch 120 does not trigger at the first flyback of the sense line 111, because the timer output transistor is turned off and is drawing no sense line current, and the diode 123 keeps the capacitor isolated from the pulse. The sequence is completed because, as soon as the timer 120 loses power, the crank solenoid power is cutoff, and with it the power to the timer 117. The timer 117 is able to keep itself powered up during this short interruption of the solenoid power, because the capacitor 124 keeps it powered for the short period required to trigger, causing the solenoid power to continue. The timer circuitry is several orders of magnitude faster than the solenoid switch transistor Q1. Even a very sensitive SCR, if substituted in place of the latch 120, does not have sufficient sensitivity to interrupt the timer 117.

The emitter of Q5 would typically be connected directly to ground. With this configuration, however, occasionally the crank extend timer 117 would not work. It has been found that, if the switching of the AC load is the slightest bit "noisy", i.e. if the contacts of main power transfer relay 102 bounce, which is common for power switches, when the AC load is first turned on, the sense line 111 would be interrupted, and with the second application of current, the latch would trigger and end the timer sequence before the generator cranks. The solution to this problem is to disconnect Q5 from a direct ground and connect it through the diode 128 to the input end of the series base resistor of transistor Q2 in the block 185 marked CONTROLLER DC POWER SWITCH. This point gets grounded after the generator powers up and the relay 102 closes. This prevents multiple closures of a noisy switch from causing the latch 120 to prematurely operate and abort the timer.

Crank Limit Timer

The controller of FIGS. 8 and 9 normally cranks the generator in a very short time, producing full power within three seconds. Thus, if conditions are normal, it should not take long to start the engine. If the engine does not start, something is obviously wrong. In order to prevent continued useless cranking when the engine does not start, the controller is provided with a crank extend timer 117 to limit the cranking time allowed. The crank limit timer 125 is an LM3905 timer circuit which is powered from the starter solenoid driver Q1. It is configured so that it triggers upon the application of power. The collector of the output transistor of crank limit timer 125 is tied to the +12V supply, and the logic pin is tied to the Vref pin, so that, during the timing period, the transistor (not shown) is open. If the voltage on the starter solenoid lasts longer than the timing period, then the output from the emitter of the output transistor (not shown) goes high, and this high level is conducted through wire 126, through diode 127, to the "set" coil of the alarm relay 118 which changes state, and the sense path is interrupted through contacts 2 and 3 of relay RY2. The power is removed from the controller by opening contacts 8 and 9 of relay RY2. The alarm circuit will be explained in detail in a later section.

When the output of the crank limit timer 125 goes high, it will also turn on transistor Q6 through line 156 and short the crank extend timer power and keep it from extending cranking. The time set into the crank limit timer 125 is preferably about 17 seconds, but with some engines it will need to be longer. It can be varied to suit conditions by changing the time constants established by the product of the values of the resistor 151 and the capacitor 152. The duration of the timer period is not at all critical, as it needs to be only a realistic maximum time for cranking.

Engine Failure Detector

The operation of the controller is keyed to a certain ordered sequence of events, and if that order is disturbed, the result can disrupt its correct operation. In order to maintain control when the engine fails for any reason (e.g. running out of fuel, a low oil cutoff, or a major breakdown), the engine failure must be detected and distinguished from a commanded stop. Since there is access to only a few electrical connections to the generator, and none to the engine except the stop controls, it is a problem to differentiate an engine failure or stoppage from any ordered stop. It also must be kept in mind that on some generators, when the load current goes below a threshold limit, the entire engine reduces its speed to a fast idle. Some Honda generators are equipped with the "Auto Throttle" feature, and they reduce their speed from 3600 RPM to 2250 RPM when the electrical load is reduced below the minimum. That is a reduction to 62.5%. The idle on some engines is as low as 50% of normal speed. The engine failure detector must not sense the idle speed as an engine failure. To be certain, if a stop pulse (produced by the stop timer 193) is present, then it is an ordered stop.

A number of logic schemes are possible to implement this function. Preferably, the combination easiest to implement is to sense the combination of the engine slowing to less than half normal speed (or even slower if the idle speed warrants it) when the controller produces no stop pulse, because if a stop pulse is produced, it is an ordered stop, and the stop pulse remains high until after the engine is completely stopped and all power is off.

Referring to block 197 marked ENGINE FAILURE DETECTOR, since the generator AC output voltage is proportional to engine speed, and since the rectified DC relay coil voltage is proportional to the AC generator output, this condition is used for an indication of less than half speed. The rectified voltage from the rectifier 103, which powers the coil of the main power transfer relay 102, is fed to the LED of an optical isolator 130, in series with a zener diode 131 rated at about one half the normal relay coil voltage, and a current limiting resistor 132 which limits the current to a safe value at the full relay voltage. The optical isolator 130 is used to isolate the logic output from the AC power. When the DC input voltage drops to less than one half of its normal value, the zener diode 131 interrupts the flow of current through the optical isolator LED 130. The isolated transistor circuit of the optical isolator 130 is arranged so that, when the input is interrupted, the output transistor of the optical isolator 130 switches off and the output of the circuit at the emitter goes from +12V to zero.

A low state (inverted logic) AND gate function is formed with a normal NOR gate 135, so that in the absence of a stop pulse, together with a low input from the speed detector, the output of the gate 135 goes high which sets the latching "alarm" relay RY2 which, in turn, interrupts the sense lead 111 and removes power from the controller. The truth table for the gate 135 is as follows:

| Input A | Input B | Output |
| --- | --- | --- |
| 0 | 0 | 1 |
| 1 | 0 | 0 |
| 0 | 1 | 0 |
| 1 | 1 | 0 |

A 0 represents 0 volts, and a 1 represents +12 Volts.

Let A represent the stop pulse.
Let LB represent the output of the engine failure detector.
Only when both inputs are low does the output go high.

This feature of the invention not only protects the controller but also keeps the controller from trying to crank the failed engine. The NOR gate 135 is formed by the diodes 133 and 134, and the inverter is formed by the operational amplifier 135 and the resistors 136, 137, and 138. A regular CMOS logic gate may be used, but it switches so fast that it may cause a false alarm. It must be kept in mind that high speed electronic logic gates which change states in nanoseconds are a poor match for logically judging the erratic functions of an internal combustion engine within which changes are measured in milliseconds. The NOR and associated component gate implementation is very slow (90 microseconds), and will thus not produce a false alarm.

The Alarm Circuit

The alarm circuit 183 is intended to suspend all controller operation in response to either an engine failure or failure to crank within a reasonable time. The block 183 marked ALARM consists of a very small (9 mm×14 mm×7.1 mm) two-coil latching relay 118 which can be trigger into the "set" state by either the engine failure detector 197 through diode 139 or by the crank limit timer 125 through diode 127. The diodes 139 and 127 are used to isolate the two sources of relay operation from each other. When in the "set" state, the starting sense line 111 is interrupted by the opening of contacts 2 and 3 of the latching alarm relay RY2 so that starting is not possible. In addition, the +12V DC power to all of the controller, except the solenoid driver, is interrupted by the opening of contacts 8 and 9 of relay RY2. In the "set" state, contact 8 is connected to contact 7 which energizes a large (10 mm) flashing red LED 140 to indicate that it is in the alarm state. It will stay in the alarm state until it is reset by the reset switch 141. The flashing LED 140 is very bright but consumes only 20 milliamperes of current at +12V DC.

The Auto-Manual and Start-Stop Switches

Referring to the AUTO-MANUAL AND START-STOP switch block 188 at the right side of FIG. 9, the difference between the MANUAL and AUTO mode is that, in the MANUAL mode, the sense lead 111 from the back contacts of the main power transfer relay 102 is interrupted by breaking contacts 4 and 5 of the AUTO-MANUAL switch 142, so no load can be set, and contact 1 of the main power transfer relay 102 is ungrounded by opening contacts 1 and 2 of the AUTO-MANUAL switch 142, which prevents the controller electronics from being powered up.

At this point, it should be recalled that the electronic switch provides power to all of the circuits of the controller except the crank circuits, which function is described in my prior '330 patent. Referring to the block 184 labeled CONTROLLER DC POWER SWITCH in FIG. 9, power is fed from the +12V DC through contacts 8 and 9 of the alarm relay 118 to the emitter of transistor Q2. Current must flow through the emitter-base junction of Q2 to ground for power to be switched on at the collector of Q2 which is the source of the controller's power. This can happen in two ways. The first is to ground the collector Q3 directly through contact 1 and out through contact 2 of switch 142, into contact 1 and out of contact 2 of the main power transfer relay 102, to ground. During the stop sequence, power must be applied to the controller until after the engine is dead stopped. Without special provision, the ground on the base resistor of Q3 would be lost when the engine slowed down and the output voltage dropped enough for the main power relay 102 to open, and at that point the stop sequence would end because power to maintain the triac and SCR drive would be lost. The stop pulse originates from pin 9 of the stop timer 150, and since it is high until the engine is completely stopped, it is used to saturate Q3 which keeps Q2 turned on and maintains power through the stop sequence.

Returning to the description of the functions of the MANUAL-AUTO switch 142, when the switch 142 is in the MANUAL position, the engine can be started by moving the START-STOP switch 143 to the up position. This closes contacts 5 and 6 of switch 143. Contact 6 of switch 143 is connected to contact 6 of switch 142 which, when switch 142 is in the MANUAL position, grounds the sense line 111 through contacts 2 and 3 of the latching alarm relay 118 and energizes the starter solenoid driver transistor Q1. The START-STOP switch is a double pole double throw switch with spring return to center. To stop the engine, the switch 143 is pushed downward to connect +12V DC to the input LED of optical isolator 144 which continues through the current limiting resister 145 and then through the LED of the optical isolator 146 to ground. This current activates the optical isolators and enables the circuit 147 which shorts the ignition coil primary and actuates the fuel cutoff solenoid circuit 148 to stop the engine. The diode 153 keep the +12V DC applied to the optical isolators during manual stop isolated from the output pin of the unpowered stop timer, which would damage it.

In the AUTO mode, contact 1 of the main power transfer relay 102, which is grounded when the relay is closed through contact 2, is connected through contacts 1 and 2 of the switch 142, and the sense line 111 is connected through contacts 4 and 5 of switch 142, allowing automatic operation.

If a two pole, three position key lock switch for the AUTO-MANUAL switch which has position 2 as the locked position where the key can be removed, then this could provide assurance that the key must be used to operate the generator in either mode. The engine will not start in the MANUAL POSITION if the alarm is activated. The controller will alarm if the engine is cranked in the MANUAL position for longer than the crank limit timer 125 allows. The crank extend timer 117 is active in the MANUAL mode.

And Alternate Version of the Controller Which Uses a Magnetic Latching Relay for Stop Functions A simpler version of the stop circuitry uses a second magnetic latching relay instead of the optical isolators and triac/SCR for shorting the ignition coil primary and initiating the fuel cutoff solenoid circuitry. Referring to the block labeled STOP CIRCUIT in FIG. 9, an alarm state initiated by engine failure actually produces a stop sequence as well. The optical isolators 144 and 146, the resistor 145, and the triac and SCR are eliminated. They are replaced with a double pole magnetic latching relay 154 with one set of normally opened contacts connected across the ignition coil primary and the other set of normally opened contacts in series with the fuel cutoff solenoid. The "set" coil of the relay RY3, i.e. relay 154, is connected to the output of the stop timer 193 through diode 153 and also to the output of the engine failure detector 197 through diode 155. The reset coil is connected to the starter solenoid switch Q1, so that when the generator is started, the relay is in the reset condition and the stop circuits are disabled.

When a normal stop is commanded by the stop timer 193 output going high and current is fed through the diode 153 to the relay "set" coil, the relay sets within 5 milliseconds and shorts the ignition coil primary and energizes the fuel cutoff solenoid. It stays set until reset again at the beginning of the next start sequence. In addition, if during operation the speed drops to less than one half without a stop pulse, then the alarm is triggered, and also the stop relay 154 is set through diode 156. This prevents the erratic start/stop behavior of the engine when it runs out of fuel.

The need for maintaining controller DC power after the relay opens is obviated, because the stopped relay 154 remains closed and needs no continued power to maintain control. Thus, transistor Q3 (in the FIG. 8 embodiment) its base-emitter resistor, its base resistor, and its connection to the stop pulse can be eliminated in the FIG. 9 arrangement. There is, however a need to maintain the stop pulse in the high state for long enough so that it is present when the engine slows down to half speed, or, otherwise, an engine failure would be indicated for an uncommanded stop. There is no need to maintain power after an engine failure induced alarm, however. The main power transfer relay 102 opens and power is interrupted at about one sixth of full speed, and by then there is no further need for power.

The combined logic states of the engine failure detector and the stop relay for this configuration are shown below:

| State | Stop Pulse Present | Speed <50% | Fail Det. Output | Stop Relay Set |
|---|---|---|---|---|
| 1 | 0 | 0 | 0 | 0 |
| 2 | 1 | 0 | 0 | 1 |
| 3 | 0 | 1 | 1 | 1 |
| 4 | 1 | 1 | 0 | 1 |

A 0 represents 0 volts and a 1 represents +12Volts.

State 4 is inconsequential, because, if a stop pulse occurs, the stop relay sets within 5 milliseconds with and without a speed reduction and what happens later does not matter.

The use of the latching relay 154 (FIG. 9) instead of the semiconductors in the stop circuit 192 (FIG. 8) is the preferred configuration because of the ability to set a stop relay 154 when an engine failure occurs. This will present the erratic start/stop behavior of the engine when it runs out of fuel.

What is claimed is:

1. A controller for controlling the operation of an electric power generator as a function of load demand, said electric power generator producing a 240V AC output and first and second 120V AC outputs developed from said 240V AC output relative to a neutral, said controller comprising:
    a manual switch switchable between a first position and a second position;
    sensing arrangement for sensing the presence and absence of a load on both said first and second 120V outputs of the electric power generator's output when said manual switch is in said first position, and for sensing the presence and absence of a load on one of said first and second 120V outputs and said 240V AC output when said switch is in said second position; and
    activating means for directly activating the electric power generator responsive to said sensing arrangement sensing the presence of a load.

2. A controller for controlling the operation of an electric power generator as a function of load demand, comprising:
    a power transfer relay having a set of normally open relay contacts which interrupt the path of AC voltage generated by said electric power generator prior to being applied to a load, said contacts closing when said power transfer relay is operated to connect electric power generated by said electric power generator to said load when said power transfer relay is enabled;
    an AC-to-DC converter for developing a DC control voltage from an AC voltage output from said electric power generator, said DC control voltage being applied to operate said power transfer relay when said DC control voltage reaches an enabling threshold;
    a DC controller operating power source independent of power generated by said electrical power generator, and wherein:
    said controller comprises electrical circuitry requiring said controller operating power;
    said electrical circuitry includes sensing means for sensing a load demand on said electrical power generator; and
    said power transfer power relay has a set of normally open contacts which when closed passes power from said controller operating power source to said electrical circuitry.

3. A controller for controlling the operation of an electric power generator driven by a gasoline engine as a function of a load demand, comprising:
    sensing means for sensing the presence and absence of a load on the electric power generator output;
    a start solenoid;
    a start sensor including a transistor connected between said start solenoid and said load, whereby the presence of a load turns on said transistor, enabling said start solenoid to start said engine, said transistor having an emitter, a collector, and a base, said start sensor further comprising a constant current source coupled between said emitter and said base for desensitizing said start sensor to variations in the resistance of the external load connected during the starting sequence.

4. A controller for controlling the operation of an electric power generator driven by a gasoline engine as a function of a load demand, comprising:
    sensing means for sensing the presence and absence of a load on the electric power generator output;
    activating means for directly activating the electric power generator responsive to said sensing means sensing said load presence;
    an ignition coil primary;
    a start solenoid;
    a fuel cutoff solenoid; and
    stopping means for stopping operation of the electric power generator responsive to said sensing means sensing the absence of a load on the electric power generator, said stopping means comprising a magnetic latching relay for shorting said ignition coil primary.

5. The controller as claimed in claim 4, comprising means for enabling said fuel cutoff solenoid when said magnetic latching relay is operated.

6. The controller as claimed in claim 4, comprising:
    timeout means for delaying the stopping of the operation of the electric power generator, in the absence of a load, for a predetermined length of time; and
    wherein said magnetic latching relay operates responsive to a delay output from said stop timer.

7. The controller as claimed in claim 4, comprising a starter solenoid switch, and wherein said magnetic latching relay is connected to said starter solenoid switch, whereby said magnetic latching relay is reset when said generator is started, for disabling said stopping means.

8. A controller for controlling the operation of an electric power generator driven by a gasoline engine as a function of a load demand, comprising:

sensing means for sensing the presence and absence of a load on the electric power generator output;

activating means for directly activating the electric power generator and producing a generator output voltage responsive to said sensing means sensing said load presence;

a stop timer for producing a stop pulse a predetermined time after the load demand ceases, said stop pulse effective to shut said engine off; and an engine failure detector outputting an engine failure output signal dependent solely upon sensing said output voltage dropping below a predetermined voltage level in the absence of said stop pulse.

9. The controller as claimed in claim 8, wherein:

said engine failure detector includes an engine speed detector, said engine failure output signal being generated upon said engine speed detector detecting an engine speed below idle speed in the absence of said stop pulse.

10. The controller as claimed in claim 8, wherein:

generation of said engine failure signal interrupts said sensing means sensing the presence and absence of a load, and removes power from said controller to prevent said controller from cranking a failed engine.

11. A controller for controlling the operation of an electric power generator driven by a gasoline engine as a function of a load demand, comprising sensing means for sensing the presence and absence of a load on a sense line connected to the electric power generator output, and activating means for directly activating the electric power generator responsive to said sensing means sensing said load presence, said activating means comprising:

a power transfer relay having normally open relay contacts which interrupt the path of AC voltage generated by said electric power generator prior to being applied to a load, said contacts closing when said power transfer relay is operated to connect electric power generated by said electric power generator to said load when said power transfer relay is enabled;

an engine cranking device; and a crank extend timer, said crank extend timer coupled to said sensing means and said engine cranking device to extend the engine cranking time for a prescribed period initiated by flyback of the sense line before the main power relay closes and terminated by flyback of the sense line after the main power relay is closed.

* * * * *